United States Patent [19]
Mann et al.

[11] Patent Number: 5,251,210
[45] Date of Patent: Oct. 5, 1993

[54] METHOD AND APPARATUS FOR TRANSFORMING LOW BANDWIDTH TELECOMMUNICATIONS CHANNELS INTO A HIGH BANDWIDTH TELECOMMUNICATION CHANNEL

[75] Inventors: Alan B. Mann; Alexander J. Ra, both of Raleigh; Jeffrey W. Reedy, Durham; Spiros J. Teleoglou, Raleigh, all of N.C.

[73] Assignee: IBM Corporation, Armonk, N.Y.

[21] Appl. No.: 786,570

[22] Filed: Nov. 1, 1991

[51] Int. Cl.[5] .......................... H04J 3/04; H04J 3/22
[52] U.S. Cl. ...................................... 370/84; 370/112
[58] Field of Search ..................... 370/112, 118, 84; 375/38, 36

[56] References Cited

U.S. PATENT DOCUMENTS

| | | | |
|---|---|---|---|
| 4,394,758 | 7/1983 | Donne . | |
| 4,394,759 | 7/1983 | Delle Donne . | |
| 4,417,348 | 11/1983 | Abbruscato . | |
| 4,458,356 | 7/1984 | Toy . | |
| 4,630,286 | 12/1986 | Betts | 375/38 |
| 4,675,886 | 6/1987 | Surie . | |
| 4,734,920 | 5/1988 | Betts | 375/38 |
| 4,744,095 | 5/1988 | Cornet et al. . | |
| 4,775,987 | 10/1988 | Miller | 370/118 |
| 4,818,995 | 4/1989 | Takahashi et al. | 375/38 |
| 4,945,533 | 7/1990 | Schroeder et al. . | |
| 5,065,396 | 11/1991 | Castellano et al. | 370/118 |

Primary Examiner—Wellington Chin
Attorney, Agent, or Firm—Bell, Seltzer, Park & Gibson

[57] ABSTRACT

Low bandwidth telecommunications channels are transformed into a high bandwidth telecommunications channel by determining the relative transmission delays among a plurality of relatively low bandwidth channels which are to be combined into a relatively high bandwidth communications channel. The transmission time delay across the plurality of low bandwidth channels is then equalized so that the time delay equalized low bandwidth channels combine to effectively form a single high bandwidth channel. The relative transmission time delays among the low bandwidth channels may be determined by transmitting an alignment (synchronization) signal across each of the low bandwidth channels, receiving the alignment signal from each of the low bandwidth channels, and measuring the time differences among the received alignment signals at each of the low bandwidth channels. Based on the measured time differences, time delay across the plurality of low bandwidth channels is equalized, so that the transmission time delay equalized low bandwidth channels may be combined to effectively form a single high bandwidth channel.

57 Claims, 8 Drawing Sheets

METHOD AND APPARATUS FOR TRANSFORMING LOW BANDWIDTH TELECOMMUNICATIONS CHANNELS INTO A HIGH BANDWIDTH TELECOMMUNICATION CHANNEL

FIELD OF THE INVENTION

This invention relates to communications systems and more particularly to the transmission and reception of information over telecommunications networks.

BACKGROUND OF THE INVENTION

The present telecommunications carrier network has evolved into a primarily digital network with industry standard transmission rates, channelization, multiplexing/demultiplexing, switching and cross-connection. The network includes both copper and optical fiber transmission cables, as well as free space (e.g. microwave) transmission. Mechanical and electronic switches are used. Equipment used to form these networks must conform to very rigid specifications which define interface signal characteristics, signal framing formats, multiplexing techniques and channel clock and jitter characteristics. This allows equipment from a variety of vendors to be used to construct the various carrier networks and to interface to the carrier networks. A high degree of compatibility among the carrier networks is also provided.

In the evolution of the telecommunications carrier network, many network communications problems have been addressed and solved. For example, carrier recovery in a network is described in U.S. Pat. No. 4,458,356 to Toy. The framing of transmitted data for alignment and synchronization within a single channel is described in U.S. Pat. Nos. 4,394,758 to Donne; 4,394,759 to Delle Donne; 4,675,886 to Surie; 4,744,095 to Cornet et al.; and 4,945,533 to Schroeder et al. Substitution of a new channel for a defective data channel is described in U.S. Pat. No. 4,417,348 to Abbruscato.

Standardization of the telecommunications network has often forced users to utilize network channels which have a higher bandwidth, and are therefore more expensive than necessary, because the channel bandwidth in the network cannot be customized. In particular, users of networks must utilize the bandwidth in the basic channel increments which are available from the telecommunications carriers. If a higher bandwidth is required than is provided by a given type of channel, the user is forced to utilize the next higher bandwidth channel even though this bandwidth may far exceed the user's requirements.

An example of the fixed data communications bandwidths which are available to a network user may be found in the "T1" and "T3" standardized channels which are made available by network carriers. The T1 channel, a 1.544 megabit signal, accommodates 1.536 megabits per second of voice and/or data communications. The next higher bandwidth which is widely available for use is the T3 channel, a 44.736 megabit per second signal, which has a payload bandwidth of 44.2 megabits per second. Intermediate rates between 1.536 megabits per second and 44.2 megabits per second are not available. Accordingly, a user application requiring a bandwidth increment greater than 1.536 megabits per second, but less than 44.2 megabits per second, must use a T3 channel at less than full capacity. Since a T3 channel is far more expensive than a T1 channel, the use of a T3 channel at less than full bandwidth is costly, and wasteful of network resources. This is especially true when the user's bandwidth requirement is a small multiple of the available T1 bandwidth, since the bandwidth ratio between the T1 and T3 channels is almost thirty.

It would be desirable to combine two or more T1 channels to obtain the requisite bandwidth. However, channel combining cannot be readily done, because there are no assurances that information transmitted over a plurality of combined channels will be received synchronously. In fact, although the commercial carriers guarantee that information transmitted over an individual channel, such as a T1 channel, will arrive intact, there is no guarantee that information transmitted over combined channels will have any predictable delay or phase relationship. Predictable delay/phase relationships among different channels cannot be assured because each channel may follow a different route through the telecommunications carrier network, even though the channels are transmitted from the same location and received at the same location. The delay differences between a group of channels which follow the same route through the network may be minimal. However, when the channels are routed through different routes on the same network carrier, or are split between different network carriers, the received information will not have a predictable delay/phase relationship.

SUMMARY OF THE INVENTION

It is therefore an object of the present invention to provide a method and apparatus for transforming a plurality of relatively low bandwidth communications channels into a relatively high bandwidth communications channel.

It is another object of the present invention to allow low bandwidth communications channels to be combined into a high bandwidth communications channel, notwithstanding arbitrary routing of the individual low bandwidth channels in the communications network.

These and other objects are provided, according to the present invention, by determining the relative transmission delays among a plurality of relatively low bandwidth channels which are to be combined into a relatively high bandwidth communications channel, and equalizing the transmission time delay across the plurality of low bandwidth channels, so that the time delay equalized low bandwidth channels combine to form a single high bandwidth channel. The relative transmission time delays among the low bandwidth channels may be determined by transmitting an alignment (synchronization) signal across each of the low bandwidth channels, receiving the alignment signal from each of the low bandwidth channels, and measuring the time delay differences among the received signals at each of the low bandwidth channels. Based on the measured time differences, time delay across the plurality of low bandwidth channels is equalized, so that the transmission time delay equalized low bandwidth channels may be combined to form a single high bandwidth channel.

In a preferred embodiment of the present invention, the received alignment (synchronization) signals are used to determine the longest transmission time delay among the plurality of low bandwidth channels. A time delay difference is calculated between each of the plurality of low bandwidth channels and the longest transmission time delay. A time delay is then added to each low bandwidth channel, corresponding to the associated calculated time delay difference. Accordingly, a delay is added to each of the low bandwidth channels so that the resultant delay equals the longest delay which is encountered. The high bandwidth data which is asynchronously received in a nonaligned state from the plurality of low bandwidth channels is thereby aligned and combined into a single high bandwidth data channel.

In the communications channel environment described above, a plurality of T1 channels may be combined into an effective single channel having a bandwidth of N times T1, for example, by transmitting the known T1 channel frame alignment pattern concurrently across each of the T1 channels. Upon receipt of the T1 channel frame alignment/synchronization patterns at the receiving end of each of the T1 channels, the transmission delay times are calculated and the requisite delay is added to each T1 channel in order to equalize the delays among the T1 channels. Once equalized, a monitor signal may be repeatedly and concurrently transmitted across each of the low bandwidth channels, in order to verify that signals remain aligned across the time delay equalized channels. In a T1 environment, the monitor signal may comprise the T1 channel frame synchronization pattern. Alternatively, it may comprise a pseudo-random data sequence which is interleaved with the transmitted information to ensure that alignment of the low bandwidth channels has not been lost.

The method and apparatus of the present invention, allows relatively low bandwidth channels to be combined to effectively form a relatively high bandwidth channel. Users need not jump to the next higher bandwidth standard channel, when the bandwidth of a channel is minimally exceeded. Fractional high bandwidth channels may thereby be created to suit an individual user's requirement, with minimal overhead and without impacting the operation of the standardized data communication network. Resources are thereby efficiently allocated and data communication costs are reduced.

DETAILED DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Prior to describing a preferred embodiment of the invention, a general description of a telecommunications network hierarchy will be provided. The problems faced by users whose required bandwidth exceeds that of a standard channel will be described. An overall system description of the present invention will be provided, followed by a description of the alignment/synchronization process according to the present invention. A description of disassembly for transmission and reassembly for reception will then be provided, followed by an end-to-end example of a "fractional T3" or other similar network according to the invention.

TELECOMMUNICATIONS NETWORK HIERARCHY

Figure 1:
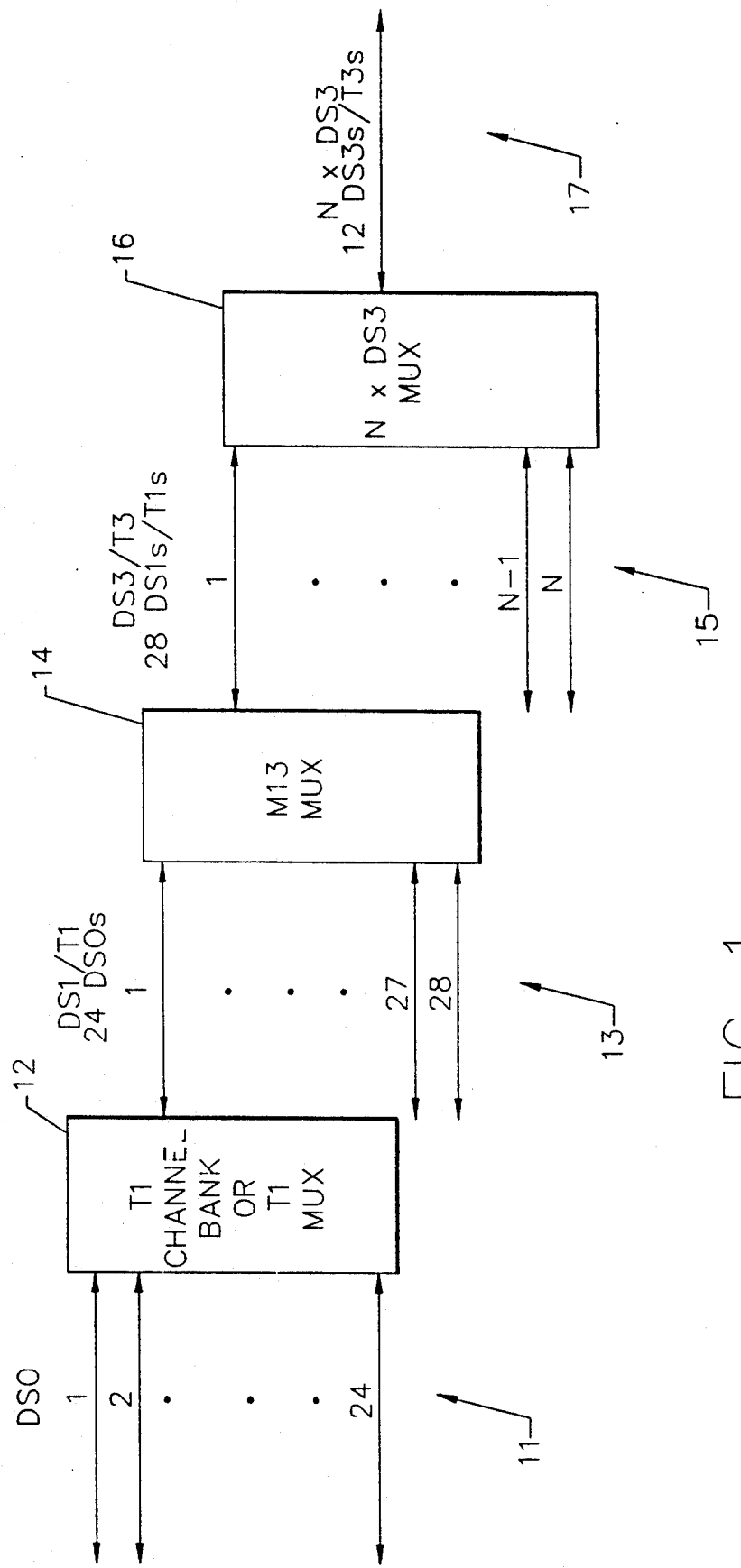
FIG. 1 is a block diagram illustrating a telecommunications carrier network hierarchy.

Referring now to FIG. 1, a general description of a telecommunications network hierarchy will now be provided. This description generally matches the North American telecommunications network. Similar descriptions apply to telecommunications networks around the world.

"DS0" channels 11 are bidirectional, duplex communication lines capable of transmitting voice and/or data at a rate of 56 kilobits per second. The total DS0 rate is 64 kilobits per second, with 56 kilobits per second dedicated to user data and 8 kilobits per second dedicated to network overhead.

T1 CHANNEL BANK 12, also referred to as a T1 MUX, is capable of combining 24 independent and synchronous DS0 bidirectional low bandwidth data channels into a "DS1" data channel 13 or a "T1" channel. A DS1 or T1 channel consists of 24 DS0 channels each operating independently of one another at a channel rate of 64 kilobits per second.

The combination of 24 DS0 channels is referred to as "D4" format, in which the DS0 channels are considered "subchannels" because they are independent. Thus, T1 MUX 12 forms a "D4" format DS1 or T1 channel consisting of 24 DS0 channels, each independently operating at 64 kilobits per second.

A second type of DS1 or T1 channel is a "clear" channel. A "clear" T1 channel is a clear "pipeline" which is not broken into subchannels. It is physically a single channel and not a combination of DS0 channels. A "clear" T1 channel is capable of transmitting voice and data at a rate of 1.536 megabits per second. The "clear" T1 channel rate is equal to 1.544 megabits per second, 1.536 megabits per second being the data rate and 8 kilobits per second dedicated to network overhead.

Still referring to FIG. 1, "M13" MUX 14 is a multiplexor which can combine up to 28 asynchronous DS1 or T1 channels, each having a channel rate of 1.544 megabits per second, into a "DS3" channel 15. Similar to DS1 or T1 channels, the DS3 or T3 channel 15 may have a M13 format consisting of multiple T1 channels, each T1 channel being D4 format or "clear". If the DS3 channel is formed by M13 MUX 14 by combining between 2 and 28 asynchronous DS1 channels, either "D4" formatted or "clear", the DS3 channel consists of 5 DS1 channels each operating independently and asynchronously of one another at a T1 channel rate of 1.544 megabits per second. This "M13" formatted T3 channel is therefore considered to have subchannels. A DS3 channel may also be a single physical "clear" channel which has a channel rate of 44.736 megabits per second, with 44.2 megabits per second being dedicated to data and the remaining bandwidth being dedicated to network overhead.

Note that the M13 MUX (device) 14 introduces an element of variable delay which is not found at the DS0/T1 level. This is because M13 MUX uses a "bit stuffing" mechanism in order to synchronize its DS1 tributaries for transmission across the carrier network. The process of "bit stuffing" utilizes elastic stores for each DS1 within the M13 MUX. At any one moment, the relative depths of the stores may be different for any two DS1s, thus introducing variable delay differences. Bit stuffing is used in most higher order North American and CCITT carrier systems. This is one more source of variable delay among individual low bandwidth channels that is compensated for by the invention.

N × DS3 MUX 16 is a multiplexor which is capable of combining up to N asynchronous DS3 or T3 channels, each operating independently and asynchronously at a channel rate of 44.736 megabits per second. A specific example in practice of a N × DS3 multiplexed channel is for N=12, wherein the channel rate for a 12× DS3 multiplexed channel is 12 DS3 channels each operating independently at 44.736 megabits per second. Thus, the multiplexed channel rate is approximately 560 megabits per second as illustrated at 17. For simplicity, DS1 and DS3 channels will hereinafter be referred to as T1 and T3 channels, respectively.

It will be understood by those having skill in the art that the channels described above are provided by the telecommunications carriers to users of the network. From a user perspective, the manner in which these channels are generated is irrelevant. All that matters is that a user may lease DS0, T1 or T3 channels, having the above described bandwidths.

PROBLEMS RESULTING FROM REQUIREMENTS EXCEEDING A STANDARD CHANNEL BANDWIDTH

The standard "clear" T1 channel bandwidth for serial data circuits is 1.536 megabits. The next bandwidth step in the hierarchy is a "clear" T3 channel which has a capacity of 44.2 megabits per second for a data circuit. The problem facing network users is that intermediate rates are not available. Thus, when a user's requirements fall between the 1.536 megabits per second capacity of a clear T1 channel and the 44.2 megabits per second capacity of a clear T3 channel, intermediate capacities between these values are not available. Rather, the user must either use several individual T1 channels or use an entire "clear" T3 channel consisting of a single physical channel and only use a portion of the available bandwidth capacity. If multiple T1 channels are used, the T1 channels operate independently and asynchronously of one another. For example, if 25 T1 channels are combined by M13 MUX (see FIG. 1), the result is 25 independent and asynchronous T1 channels each operating at a channel rate of 1.544 megabits per second and not an effective single synchronous channel rate of $25 \times 1.544 = 38.6$ megabits per second.

The present invention solves this problem by permitting use of multiple clear T1 channels to effectively obtain a single high bandwidth channel having an effective payload data rate of $N \times 1.536$ megabits per second and a channel rate of $N \times 1.544$ megabits per second.

OVERVIEW OF A "FRACTIONAL T3" CHANNEL—TRANSFORMATION OF LOW BANDWIDTH COMMUNICATIONS CHANNELS INTO A HIGH BANDWIDTH COMMUNICATION CHANNEL

An embodiment of the present invention effectively combines multiple serial data channels, i.e. clear T1 channels each having a payload data rate of 1.536 megabits per second, into a single higher speed serial data channel, having a payload data rate less than the 44.2 megabits per second rate of a clear T3 channel. As a result, the present invention provides "fractional T3" channels or single effective high bandwidth channels in multiples of the network channel speed using the lower speed clear T1 channels. It will be understood by those having skill in the art that the present invention may provide any "fractional T×" channel, which is a channel having a data rate falling between the rates for two existing channels. Thus, the invention may be used to form any single high bandwidth channel from a plurality of lower bandwidth nonaligned channels. This is accomplished using two processes: "disassembling" before transmission and "reassembling" after transmission.

Before transmission, large user datastreams on a high bandwidth serial data channel are "disassembled" into individual datastreams on multiple lower speed lower bandwidth network serial data channels, e.g. multiple T1 channels. After transmission, the individual datastreams on the multiple network lower bandwidth serial data channels, are "assembled" or "reassembled" into the large user datastream on a higher bandwidth, serial data channel. Disassembly of the large user datastream on the high bandwidth channel permits transmission of the disassembled individual datastreams across a number of individual lower bandwidth, lower speed network serial data channels. The assembling or reassembling of the individual datastreams received on the low bandwidth, lower speed network data channels results in formation of large, aggregate datastream on a high bandwidth data channel.

The individual low bandwidth carrier network data channels often experience unequal transmission time delays resulting in the various individual datastreams being received at different times on the low bandwidth channels. This is caused by the individual disassembled datastreams being routed across low bandwidth data channels having different routings between the transmitter and the receiver. The present invention accounts for the different transmission time delays between the transmitter and the receiver by or aligning/synchronizing the low bandwidth data channels on the receiving end.

Figure 2:
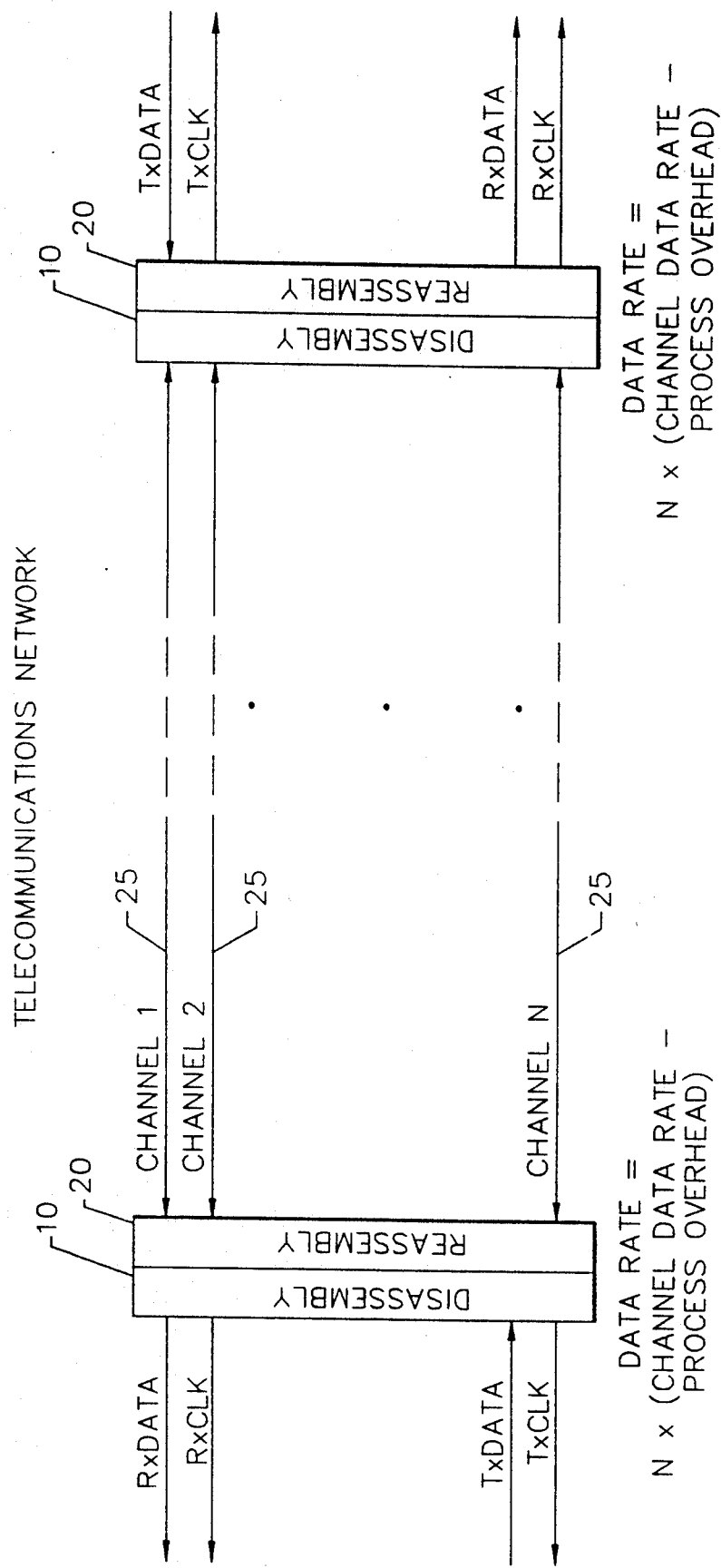
FIG. 2 is a high level block diagram illustrating a carrier network for implementing an effective single high bandwidth channel according to the present invention.

Referring to FIG. 2, an overview of the implementation of a "fractional T×" channel according to the invention is illustrated. For simplicity, a "fractional T×" channel will be referred to hereinafter as a "fractional T3" channel. It will be understood by those having skill in the art that the invention covers other variations.

The "fractional T3" channel provides duplex communication in that data communication can be in either direction, i.e. bidirectional. In other words, each node or end of the carrier network is capable of transmitting and receiving data. Thus, each end includes DISASSEMBLY element/step 10 and REASSEMBLY element/step 20, so that each end can disassemble transmission data T×DATA on the high bandwidth channel into individual datastreams for transmission on the low bandwidth data channels of the carrier network at a data rate of N × (channel data rate—process overhead). Similarly, each end of the carrier network (system) can also receive the transmission data T×DATA and then forward the received data R×DATA in its reassembled form to the user interface. Thus, disassembling and reassembling occurs on both ends of the carrier network.

Figure 3:
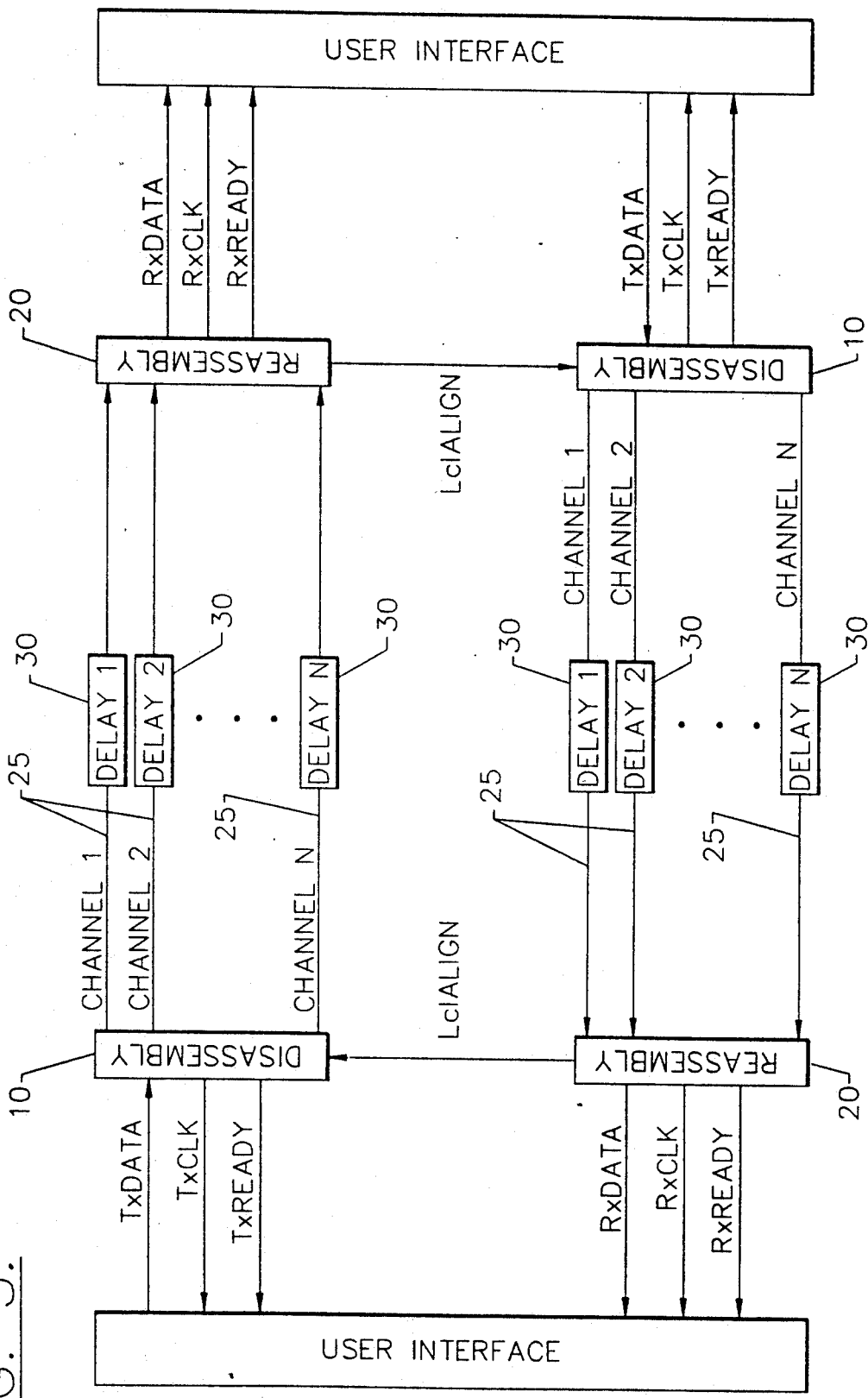
FIG. 3 is a block diagram further illustrating additional details of FIG. 2 according to the present invention.

Referring to FIG. 3, the implementation of the "fractional T3" system providing bidirectional data communication is illustrated in more detail. The "fractional T3" channel combines serial low bandwidth data channels available from carrier networks into a single, higher speed, higher bandwidth data channel operating at a data transmission rate equal to the combined rate of the individual low bandwidth channels. The individual low bandwidth data channels are end to end synchronous. The low bandwidth data channels 25 are identified as CHANNEL 1–CHANNEL N in FIG. 3. The transmission of data on the individual, low bandwidth channels 25, each experience a certain amount of transmission delay. This delay, DELAYs 1−N, identified generally at 30 may be different for each of the individual channels 25.

The "fractional T3" channel may be implemented in two parts: the "disassembly" of a large datastream on a high bandwidth channel into multiple datastreams for transmission on low bandwidth channels, and the "assembly" or "reassembly" of the individual datastreams on the low bandwidth channels into a single aggregate datastream on a high bandwidth channel. DISASSEMBLY 10 occurs as part of the transmission of data and REASSEMBLY 20 occurs as part of receiving of data.

DISASSEMBLY element/step 10 separates user data T×DATA into multiple individual datastreams for transmission across individual low bandwidth serial data channels, CHANNELs 1−N, of the carrier network. Generally, DISASSEMBLY 10 generates a reference clock signal T×CLK as part of the alignment process to time each of the individual serial data channels 25. A unique alignment pattern is transmitted across each of the individual low bandwidth channels 25 and is used at the receiving end for aligning the individual datastreams received on channels 25. The alignment pattern is transmitted for a period of time until all of the individual data channels 25 are aligned and thus, the transmission time delay for each of channels 25 has been accounted for and the incoming data will be aligned.

Once channels 25 are aligned, the individual datastreams are transmitted on the low bandwidth serial data channels 25 along with an alignment monitor pattern/signal. The user data T×DATA is sequentially routed to each of channels 25. Transmission of T×DATA begins once the user interface receives T×READY equal to TRUE indicating that the individual serial data channels are aligned and that the user data to be transmitted may be forwarded to the receiving end of the circuit. DISASSEMBLY 10 inserts the alignment monitor pattern/signal into the individual low bandwidth datastreams for transmission across channels 25.

The user transmission data T×DATA is clocked by the user interface based on the transmission clock T×CLK, generated by DISASSEMBLY 10. T×CLK is generated by an oscillator within DISASSEMBLY 10. T×DATA is clocked from the user interface by T×CLK at a rate equivalent to the combined payload data rate of all of the individual data channels 25. The payload data rate is equivalent to the combined payload data rate minus the alignment monitor pattern data rate, i.e. payload data rate=N × (channel data rate−process overhead). The process overhead includes the overhead for alignment monitoring.

Still referring to FIG. 3, an overview of REASSEMBLY element/step 20 will now be described. REASSEMBLY 20 performs initial alignment/synchronization of the channels 25 by monitoring each of the low bandwidth data channels 25 for the alignment pattern. Based on the receipt of the alignment patterns transmitted on channels 25, REASSEMBLY 20 determines which serial data channel has the longest transmission time delay. The longest delay is used to determine the variable delay of each of the remaining serial data channels. The difference between the longest transmission delay and the delay for each channel is added to the delay for each data channel, causing all of the serial data channels to experience the same amount of delay.

Once alignment using the alignment pattern is completed, REASSEMBLY 20 receives the transmitted individual datastreams on each of the low bandwidth data channels, and continuously monitors each individual channel for the alignment monitor pattern to ensure that channel alignment is maintained. The R×READY signal is used to alert the user interface that valid user data is being transmitted. REASSEMBLY 20 separates the alignment monitor pattern from the incoming user data, and combines the individual user datastreams by sequentially interleaving the user datastreams from each of the low bandwidth data channels. The resulting aggregate user datastream is clocked on the R×DATA line to the user interface by R×CLK, which is generated by REASSEMBLY 20. The rate of R×CLK is equal to the combined payload data rate of the individual network serial data channels, CHANNELs 1−N, i.e. data rate=N × (channel data rate−process overhead), where process overhead includes the overhead for alignment monitoring.

A LclALIGN signal is used by REASSEMBLY 20 once the serial data channels 25 are aligned, to indicate to DISASSEMBLY 10 that the data channels are aligned. The LclALIGN signal is also used to indicate that, based upon monitoring of the alignment monitor pattern, the channels are out of alignment and that DISASSEMBLY 10 should retransmit the alignment pattern.

ALIGNMENT OF CARRIER NETWORK CHANNELS

The initial alignment of the serial data channels of the carrier network and alignment monitoring may be accomplished in a number of ways. Two alternatives for accomplishing the alignment and monitoring of alignment are: (1) use alignment and alignment monitor patterns which are the same; or (2) use alignment and alignment monitoring patterns which are different. In the above described embodiment of a "fractional T3" channel, the T1 frame synchronization pattern may be used as both the alignment pattern and the alignment monitor pattern, as will now be described.

Figure 4:
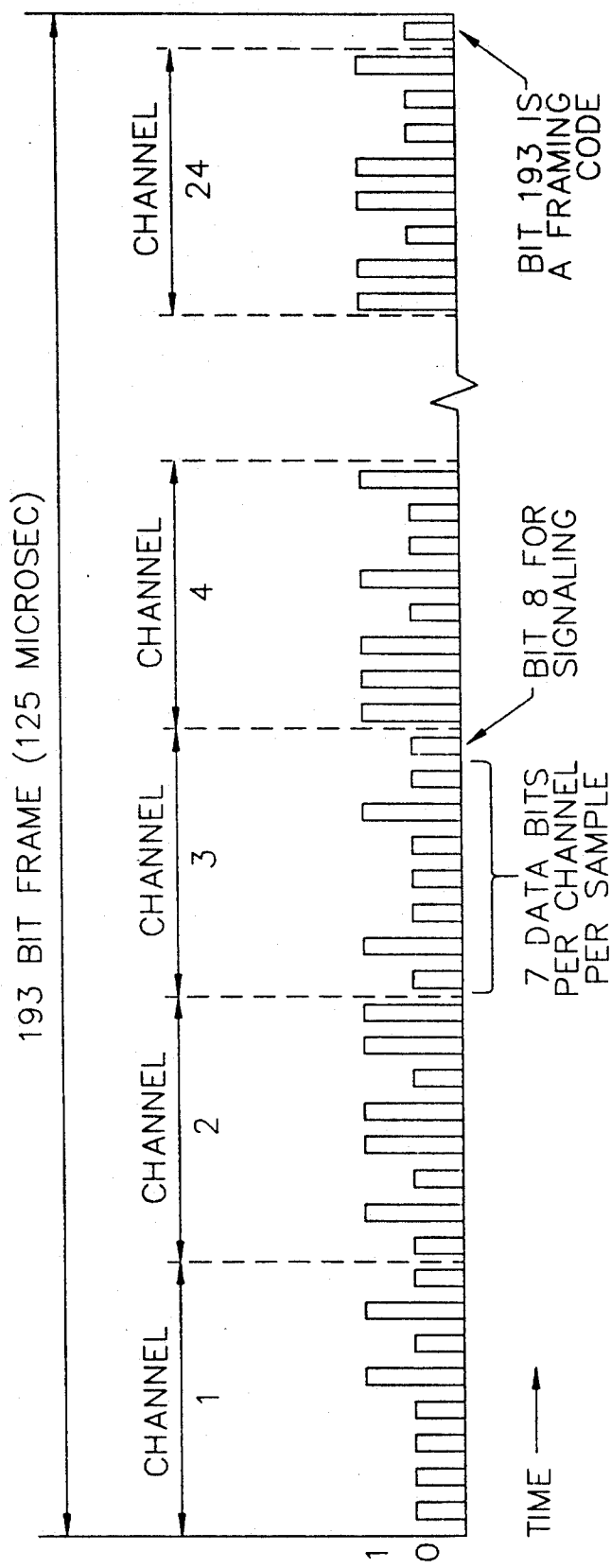
FIG. 4 is a representation of the bit frame for a T1 channel.

Each frame transmitted on a T1 channel consists of 193 bits; 192 data bits and one framing bit (code). The 193rd bit of each frame is the framing bit position. The 192 data bits consist of 24 data channels multiplexed onto the T1 carrier channel, wherein each channel has 7 databits and one signalling bit. Referring to FIG. 4, the breakdown of the 193 bit T1 channel frame is illustrated. FIG. 4 was adapted from Tannenbaum, Andrew S., Computer Networks, Prentice-Hall, Inc., 2nd Ed., 1988, pp. 79-80.

For Extended Superframe Mode on serial T1 data channels, one out of every four frame bit positions is used to send a frame bit. The frame bit pattern sequence is 001011. This frame bit pattern sequence gets repeated once every twenty-four T1 channel frames. In other words, "0" is the frame bit for one of the first four frame bit positions, "0" is the frame bit for one of the fifth through eighth frame bit positions, "1" is the frame bit for one of the ninth through twelfth frame bit positions, "0" is the frame bit for one of the thirteenth through sixteenth frame bit positions, "1" is the frame bit for one of the seventeenth through twentieth frame bit positions, and "1" is the frame bit for one of the twenty-first through twenty-forth frame bit positions.

Since the alignment pattern is the same as the frame bit pattern, also known as frame sync pattern, detection of the frame sync pattern also results in detection of the alignment pattern. If the incoming data is not in frame sync, the receiver forms a frame search for the frame bit pattern. The frame bit pattern must be valid for several repetitions before frame sync is declared. Frame pattern detection may be further qualified by using other techniques such as a correct Cyclic Redundancy Check (CRC), in the Extended Superframe Frame Facility Data Link. The application of CRC to the present invention will be understood by those having skill in the art.

Thus, alignment of the serial T1 channels 25 is obtained by equalizing the effective transmission time delay for each T1 data channel by adding a variable delay based on the longest transmission time delay 30 (FIG. 3) so that the frame sync from each individual data channel occurs at the same time. Once initial alignment is obtained, the frame pattern is also transmitted with the user data by interleaving a frame bit at one out of every four frame bit positions, i.e. a frame bit occupies bit 193 for one out of every four 193 bit frames. Since the frame bit (sync) pattern is always transmitted with the user data, it can also be used as the alignment monitor pattern. Thus, once initial alignment of all T1 channels is obtained, alignment can be monitored by monitoring the frame sync pattern for each of the T1 data channels which is continuously transmitted with the data as described above. If the frame sync of all of the individual data channels does not occur at the same time, a LclALIGN signal is produced by REASSEMBLY 20 to indicate that the channels are no longer aligned and that realignment must occur.

It is also possible to align and monitor alignment of the data channels using an alignment pattern which is different from the alignment monitor pattern. A different alignment pattern may be needed because the overall phase difference between the serial data channels which can be compensated for is about one half of the alignment pattern repetition rate. Therefore, when the alignment pattern and alignment monitor pattern are the same as described above, the system is limited to one half the frame repetition period. Thus, in order to compensate for greater delay, a different alignment pattern must be used. One possible alignment pattern is a pseudorandom data sequence generated by a $2^{23}-1$ polynomial. A $2^{23}-1$ polynomial provides a pseudorandom pattern having a length of 23 bits generated by 23 bit latch logic. An alignment pattern generated by a pseudorandom data sequence has a much longer repetition period.

Implementation of a "fractional T3" channel using an alignment pattern which is different from the alignment monitor pattern will now be described. When REASSEMBLY 20 determines that CHANNELs 1-N are not aligned, it generates an appropriate LclALIGN signal which is transmitted to corresponding DISASSEMBLY 10. DISASSEMBLY 10 transmits the pseudorandom alignment pattern on each of the serial T1 data channels. Transmission of the pseudorandom alignment pattern on each T1 channel continues until the corresponding REASSEMBLY 20 determines that all T1 data channels are aligned and indicates this by transmitting an LclALIGN signal to DISASSEMBLY 10. DISASSEMBLY 10 then transmits the individual datastreams on the serial T1 data channels.

Monitoring of alignment when the alignment and alignment monitor pattern are different is performed in the same manner as described above with respect to using the frame bit pattern. Thus, the alignment monitor pattern may be the same as the frame sync pattern. In this instance, the frame sync pattern may be used as the alignment monitor pattern because the probability that one or more of CHANNELs 1-N will become misaligned within an integral number of frame repetition periods is extremely low.

The LclALIGN signal, generated by REASSEMBLY 20, is used to indicate to DISASSEMBLY 10 that CHANNELs 1-N are aligned. The LclALIGN signal may also be used to indicate that CHANNELs 1-N are not aligned. If the frame sync pattern is used as both the alignment pattern and the alignment monitor pattern, the LclALIGN signal is not needed to indicate that the alignment is lost because the alignment pattern (frame sync pattern) is always transmitted. However, when an alignment pattern is used which is different from the alignment monitor pattern, the alignment pattern is always transmitted in place of user data. Therefore, if an alignment pattern is used which is different from the alignment monitor pattern, REASSEMBLY 20 must instruct DISASSEMBLY 10 to transmit the alignment pattern when it is determined that CHANNELs 1-N are no longer aligned. In the present invention, this is accomplished by REASSEMBLY 20 transmitting the alignment pattern to DISASSEMBLY 10. Thus, the system assumes that the data link between a first user interface and a second user interface is not useful unless CHANNELs 1-N are aligned. The "fractional T3" system avoids "racing" situations by having the node of the network which transmits the data, i.e. DISASSEMBLY 10, wait a minimum period of time after observing the LclALIGN signal before discontinuing transmission of the alignment pattern. Alternatively, an alignment lost signal may be used.

DETAILED DESCRIPTION OF DISASSEMBLY

Figure 5:
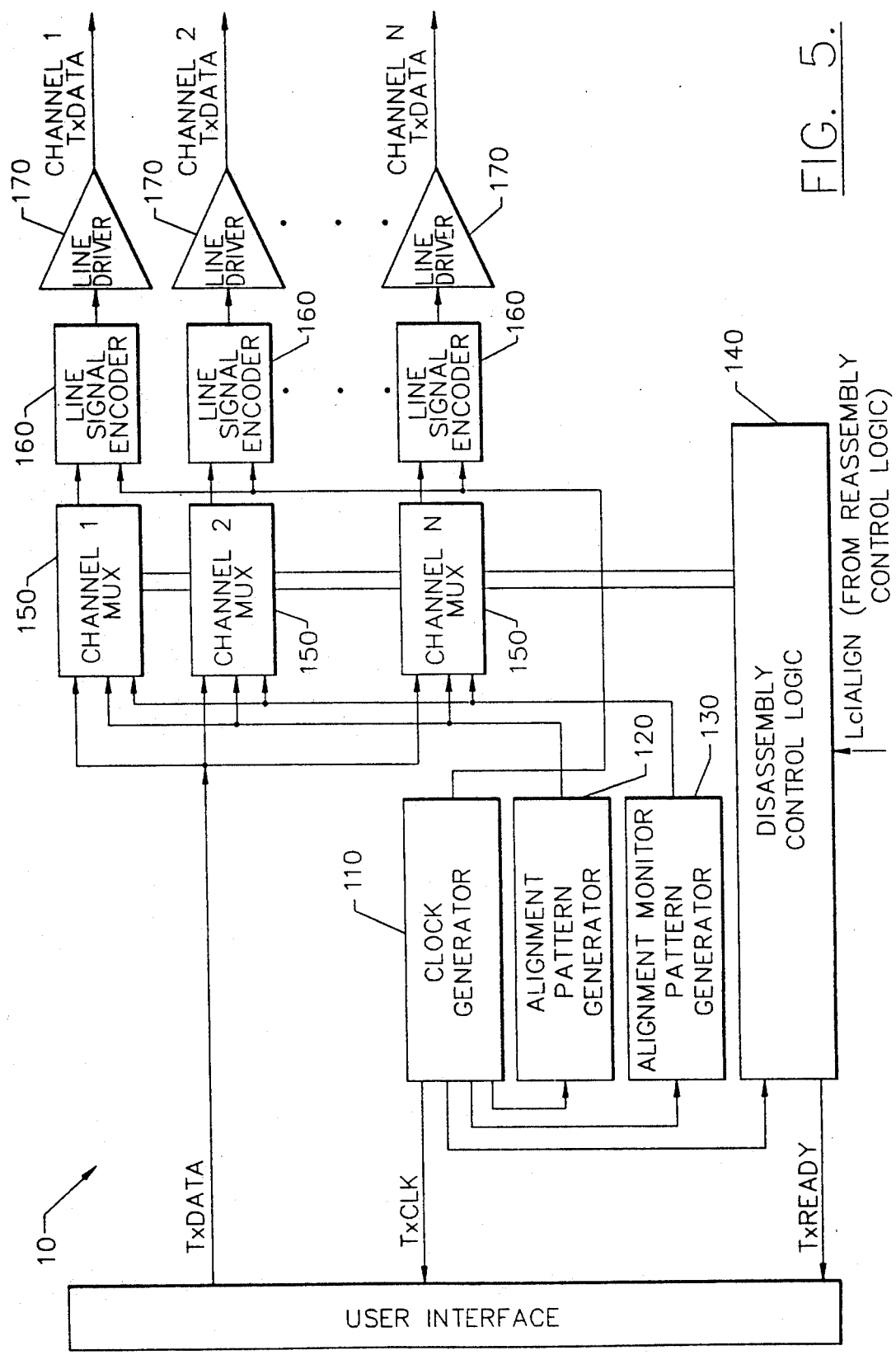
FIG. 5 is a block diagram illustrating the disassembly for implementing an effective single high bandwidth channel according to the present invention.

Referring to FIG. 5, DISASSEMBLY element/step 10 will now be described in detail. FIG. 5 provides a block diagram of DISASSEMBLY 10 and includes clock generator 110, alignment pattern generator 120, alignment monitor pattern generator 130, disassembly control logic 140, channel multiplexors (CHANNEL 1-N MUXes) 150, line signal encoders 160, and line drivers 170.

Generally, clock generator 110 is connected to alignment pattern generator 120, alignment monitor pattern generator 130, disassembly control logic 140, and line signal encoders 160. Clock generator 110 provides the timing for the disassembly process including timing for the T1 data channels by clocking line signal encoders 160, the alignment pattern generator 120, the alignment monitor pattern generator 130, the disassembly control logic 140, and the user interface via the T×CLK signal. More specifically, clock generator 110 provides the clocking signal T×CLK for clocking the user transmit data T×DATA from the user interface at a rate equivalent to the combined payload data rate of CHANNELs 1-N. T×CLK is generated by an oscillator. The payload data rate as previously defined is equal to the number of T1 data channels times the individual data channel rate minus the process overhead, i.e. payload data rate=N × (channel data rate−alignment monitoring pattern data rate).

The reference clock signal must also meet the frequency tolerance and jitter specifications for the individual data channels. All other clocks maintain synchronization with the reference clock. The clock signals provided by the clock generator 110 to alignment pattern generator 120 and alignment monitor pattern generator 130 are equal to the data rate required for the specific pattern. For example, if the T1 data channels CHANNELs 1-N have a data rate equal to 1.544 megabits per second and the data rate of the alignment monitor pattern is 8 kilobits per second, then the user interface T×CLK signal rate is N ×1.536 megabits per second.

The alignment pattern generator 120 generally provides a pattern for aligning CHANNELs 1-N prior to transmission of user transmit data T×DATA. REASSEMBLY 20 (see FIG. 3) receives the alignment pattern on each of CHANNELs 1-N and adjusts the transmission time delay, i.e. DELAYs 1-N, of each channel based on the longest transmission time delay and the variable transmission delays for those channels having a transmission delay less than the longest transmission delay. More specifically, the alignment pattern generator 120 provides a periodic bit pattern having a period (pattern length/data rate) greater than double the maximum expected delay difference between any two individual T1 channels during the initial alignment of CHANNELs 1-N. The alignment monitor pattern is used by REASSEMBLY 20 on the receiving end of the carrier network to determine the relative transmission delay of each of CHANNELs 1-N, and to adjust the transmission delays DELAYs 1-N (see FIG. 3), so that all T1 data channels experience the same transmission delay. The specific types of alignment patterns and implementation of the system using the specific type of alignment patterns have been previously described with respect to alignment.

Still referring to FIG. 5, the alignment monitor pattern generator 130 generally provides an alignment monitoring pattern which is transmitted with user transmit data T×DATA on CHANNELs 1-N. The alignment monitor pattern produced by generator 130 is interleaved with the user transmit data T×DATA by the channel multiplexors, CHANNEL 1−N MUXes 150 REASSEMBLY 20 continuously monitors each individual T1 data channel for the alignment monitor pattern produced by generator 130 to ensure that alignment of CHANNELs 1−N is maintained.

More specifically, alignment monitor pattern generator 130 generates a periodic pattern where the period equals the alignment monitor pattern length plus the user data rate. The alignment monitor pattern produced by generator 130 is determined by three factors: (1) the time required by REASSEMBLY 20 (see FIG. 3) to detect the loss of alignment between the individual T1 data channels, (2) the bandwidth required to transmit the alignment monitor pattern, and (3) the probability that the alignment monitor pattern will be duplicated in the user data T×DATA which is transmitted with the alignment monitor pattern over CHANNELs 1-N. The specific implementations of the alignment monitor pattern have been previously described with respect to alignment.

Disassembly control logic 140 provides the sequencing logic for DISASSEMBLY 10 and provides a T×READY signal to the user interface to indicate that user data can be transmitted. Disassembly control logic 140 is controlled by a clocking signal from clock generator 110 and a LclALIGN signal from the companion reassembly control logic of REASSEMBLY 20. Disassembly control logic 140 controls the individual T1 channel multiplexors 150 by providing the selection inputs for multiplexors 150. The selection signals provided by disassembly control logic 140 to the individual channel multiplexors 150 control the inputs of user transmit data T×DATA, the alignment pattern generated by alignment pattern generator 120 and the alignment monitor pattern generated by generator 130 for output onto the individual T1 data channels during each interval. The operations performed by disassembly control logic 140 will be described with respect to FIG. 6.

The individual T1 channel multiplexors 150 act as selectors/multiplexors for the individual data channels and are controlled by the output of disassembly control logic 140. Multiplexors 150 receive as inputs the user transmit data T×DATA, the alignment pattern produced by generator 120 and the alignment monitor pattern produced by generator 130. The output signal from the individual channel multiplexors selected by disassembly control logic 140, is transmitted over the corresponding individual T1 data channels 25 (FIG. 1). When CHANNEL 1-N MUXes select the alignment pattern as a result of the selection signals received from disassembly control logic 140, no other input to CHANNEL 1-N MUXes is selected. When the individual channel multiplexors receive selection signals from disassembly control logic 140 for the alignment monitor pattern and user transmit data T×DATA, the data and pattern are multiplexed and transmitted concurrently across CHANNELs 1-N. Each of the individual T1 channel multiplexors 150 select only every nth bit of the user transmit data T×DATA, where n is equal to 1 through N. Insertion of the bits of the alignment monitor pattern into the individual datastreams for transmission on CHANNELs 1-N has been previously described with respect to alignment.

Line signal encoders 160 are controlled by the reference clock generated by clock generator 110. Line signal encoders 160 output the alignment pattern or T×DATA/alignment monitor pattern selected by CHANNEL 1-N MUXes 150 when clocked by the clock signal from generator 110. The output of the alignment pattern or T×DATA/alignment monitor pattern of line signal encoders 160 are transferred to line drivers 170 for transmission on CHANNELs 1-N. Operation of line drivers 170 will generally be understood by those having skill in the art and need not be described further herein.

Figure 6:
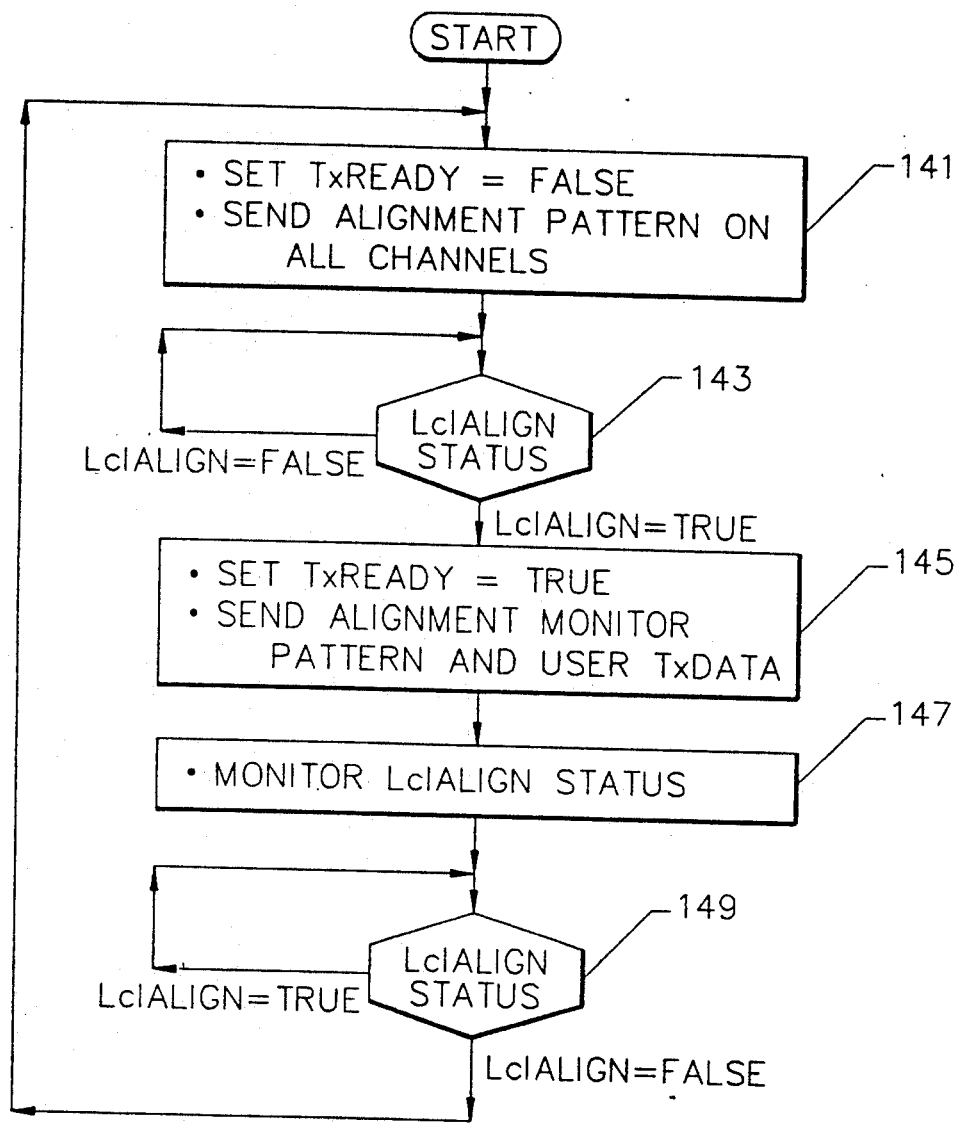
FIG. 6 illustrates the operations performed by the disassembly control logic for implementing a single high bandwidth channel of FIG. 5.

Referring to FIG. 6, the operations performed by disassembly control logic 140 will now be described. These operations may be implemented using a general purpose microprocessor running a stored program by special purpose logic, or by other well known means. At Block 141, T×READY is set to FALSE, and provided to the user interface to indicate that valid user data is not to be transmitted on the carrier network. Block 141 also sends a select signal to CHANNEL 1-N MUXes 150 so that the T1 channel multiplexors will select the alignment pattern and concurrently transmit the pattern on all individual T1 data channels CHANNELs 1-N. Disassembly control logic 140 then monitors the status of the incoming LclALIGN signal at Block 143 to determine whether CHANNELs 1-N are aligned. This signal is returned from the data receiving end via the REASSEMBLY 20 of the transmitting end.

If it is determined at Block 143 that LclALIGN equals FALSE, disassembly control logic 140 continues to monitor the status of the LclALIGN signal received from REASSEMBLY 20 until all of the T1 channels 25 at the receiver are aligned. If it is determined at Block 143 that the LclALIGN signal received from REASSEMBLY 20 is TRUE, disassembly control logic 140 sets T×READY equal to TRUE at Block 145, and transmits the signal to the user interface to indicate that user transmit data T×DATA may be sent to the far end receiver of the carrier network.

Disassembly control logic 140 then transmits select signals to CHANNEL 1-N MUXes 150, to select the user transmit data T×DATA from the user interface and the alignment monitor pattern produced by generator 130. The user data T×DATA/alignment monitor pattern are then transmitted across the T1 data channels of the carrier network (Block 145). Finally, disassembly control logic 140 monitors the status of the LclALIGN signal received from REASSEMBLY 20 which indicates that CHANNELs 1-N are still in alignment. If it is determined at 149 that LclALIGN equals TRUE, disassembly control logic 140 continues to monitor this signal. However, if it is determined at 149 that LclALIGN received from REASSEMBLY 20 equals FALSE, disassembly control logic 140 then proceeds to set T×READY equal to FALSE at 141, transmit this signal to the user interface to indicate that the user data cannot be transferred across the carrier network, and proceed to align the T1 data channels CHANNELs 1-N of the carrier network by transmitting the alignment pattern produced by generator 120.

DETAILED DESCRIPTION OF REASSEMBLY

Figure 7:
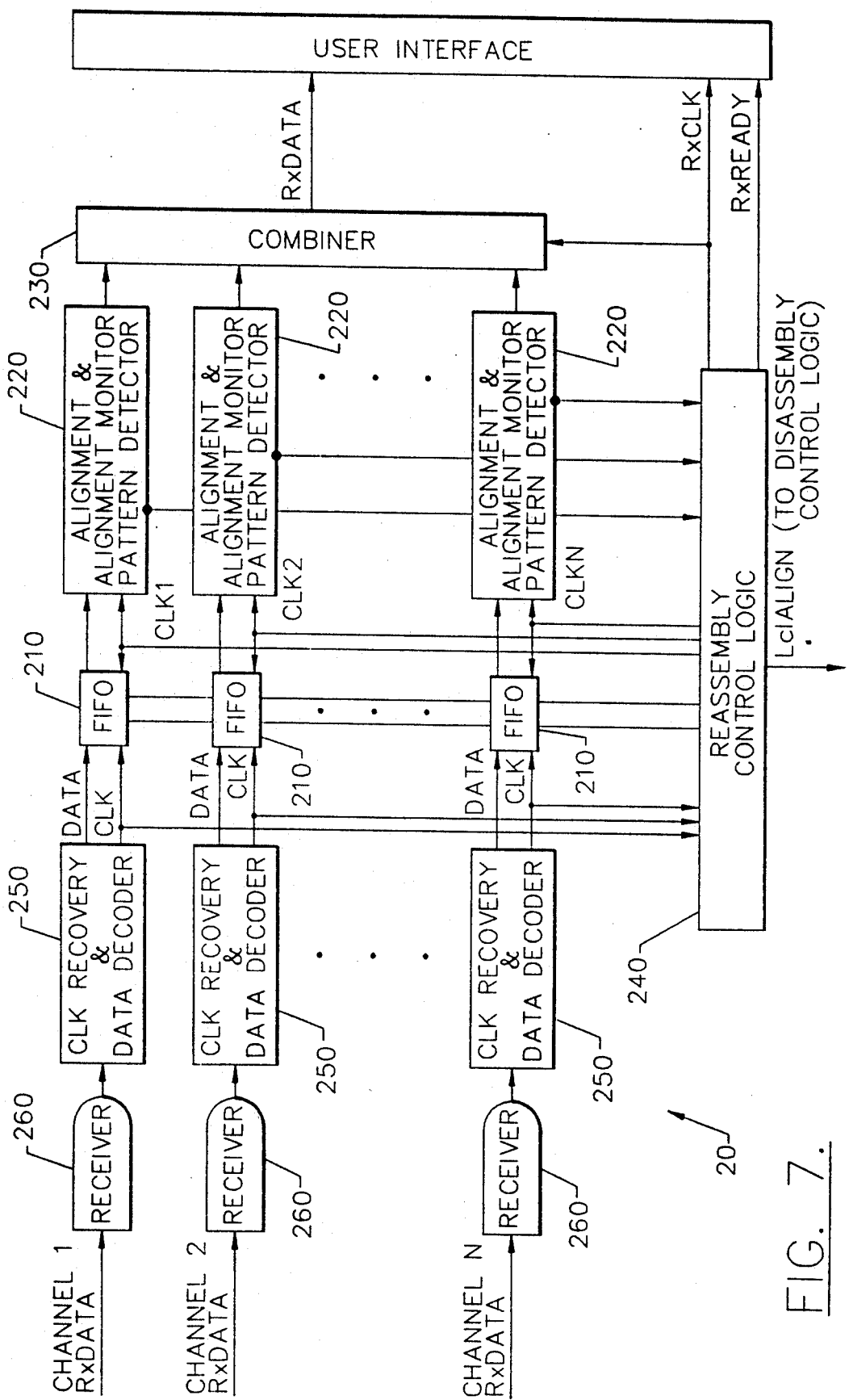
FIG. 7 is a block diagram illustrating the reassembly for implementing a single high bandwidth channel according to the present invention.

Referring to FIG. 7, REASSEMBLY element/step 20 will now be described. REASSEMBLY 20 consists of FIFO (First-In First-Out) memories 210, alignment and alignment monitor pattern detectors 220, combiner 230, reassembly control logic 240, clock recovery and data decoders 250, and receivers 260. Generally, the REASSEMBLY element/step 20 monitors each of the individual T1 data channels 25 of the carrier network for the alignment pattern. The individual T1 channel(s) having the longest transmission time delay is/are detected, and a variable transmission delay based upon the longest transmission delay is added to each of the other individual T1 channels, to compensate for the transmission time delay so that all channels experience the same delay. Once the alignment process is complete, REASSEMBLY 20 monitors each of the individual T1 data channels CHANNELs 1-N for the alignment monitor pattern to ensure that alignment is maintained. The reassembly process is controlled by reassembly control logic 240.

More specifically, receivers 260, one associated with each of CHANNELs 1-N, receive the alignment pattern or T×DATA/alignment monitor pattern from the transmitting end of the carrier network (system). The received user data is referred to as R×DATA. The operation of receiver 260 will be understood by those having skill in the art. The alignment pattern or R×DATA/alignment monitor pattern received by receivers 260 is transmitted to clock recovery and data decoders 250 for recovering the clocks and decoding R×DATA.

Clock recovery and data decoders 250 first recover a clocking signal from the incoming channels. This is necessary to ensure that clocking of REASSEMBLY 20 is synchronized with the far end transmitter. The recovered clocks are transmitted to reassembly control logic 240. Since the signals received on CHANNELs 1-N are analog, clock recovery and data decoders 250 then convert the received R×DATA signals from analog to digital. Clock recovery and data decoders 250 clock R×DATA to the respective FIFO memory 210 and output the recovered clock signals to reassembly control logic 240.

Still referring to FIG. 7, FIFO memories 210 will now be described. Each FIFO memory 210 may be implemented as a First-In First-Out shift register. FIFO shift registers are known to those having skill in the art. Each FIFO 210 accommodates the transmission time delay, DELAYs 1-N, for the respective T1 data channel CHANNELs 1-N. The user data R×DATA received on CHANNELs 1-N is clocked into the corresponding FIFO memory 210 by the recovered clock CLK for each channel. The individual datastreams stored in FIFO memories 210 are clocked out of FIFOs 210 by CLKs 1-N which are generated by reassembly control logic 240.

The depth of each FIFO 210, which is expressed in bit intervals, must be greater than the longest transmission time delay in terms of bit intervals between any two of the individual T1 data channels. Thus, in essence, the transmission time delay on each individual T1 data channel is accommodated by holding, i.e. "gapping" CLKs 1-N generated by reassembly control logic 240 for the variable amount of transmission time delay experienced by each individual T1 data channel. Once the amount of time corresponding to the transmission delay for the particular individual T1 data channel has elapsed, reassembly control logic 240 outputs the generated CLKs 1-N signals for each of the individual T1 data channels to clock the received R×DATA from the respective FIFO memory 210 to the corresponding alignment and alignment monitor pattern detector 220.

Still referring to FIG. 7, alignment and alignment monitor pattern detectors 220 will now be described. Detectors 220 monitor the datastreams, i.e. R×DATA, received on CHANNELs 1-N and which are outputted by FIFO memories 210, to identify the alignment pattern and the alignment monitor pattern. Detectors 220 detect the alignment pattern and generate a pulse signal for every period that a valid alignment pattern is received. The pulse signal generated by detectors 220 are outputted to reassembly control logic 240 for adjusting the depth of FIFO memories 210 during the alignment phase by adjusting the CLKs 1-N clocking signals, and for detecting loss of alignment during the alignment monitoring phase. Once the channels are aligned and user data is being transmitted across the carrier network, alignment and alignment monitor pattern detectors 220 separate the alignment monitor pattern from the user data in the individual datastreams received on CHANNELs 1-N. The individual datastreams, stripped of the alignment monitor pattern, are outputted by detectors 220 to combiner 230.

Generally, combiner 230 sequentially interleaves the individual datastreams comprising the user data received on the low bandwidth, T1 data channels CHANNELs 1-N and transmits the combined aggregate datastream on a high bandwidth channel to the user interface. More specifically, combiner 230 forms a single high bandwidth datastream R×DATA by sequentially interleaving the individual user datastreams received on CHANNELs 1-N in the same order that the individual datastreams were transmitted by DISASSEMBLY 10. R×DATA is clocked out of combiner 230 to the user interface by R×CLK, which is generated by reassembly control logic 240. R×CLK has a clock rate equal to the combined payload data rate of the individual T1 data channels of the carrier network, i.e. R×CLK=N × (data channel rate−alignment monitor pattern data rate).

Still referring to FIG. 7, reassembly control logic 240 will now be described. Generally, reassembly control logic 240 controls the reassembly process. It receives the clocking signals recovered from each of the T1 data channels, adjusts the depth of each FIFO memory 210 based on the variable transmission time delay of each T1 data channel, generates CLKs 1-N for clocking the alignment patterns and user data/alignment monitor patterns from the FIFO memories 210 to detectors 220, generates a receiver clock R×CLK for clocking the user data out of combiner 230 and transmits R×CLK to the user interface as well as a R×READY signal to the user interface to indicate that valid user data is being sent to the user interface.

More specifically, reassembly control logic 240 has as inputs the pattern frame signals from each alignment and alignment monitor pattern detector 220, and CLK from each clock recovery and data decoder 250 corresponding to each T1 data channel. The CLKs, extracted from the channels to ensure that REASSEMBLY 20 is synchronized with the far end transmitter, are used by reassembly control logic 240 to control the timing of the reassembly logic and to generate the CLK1−CLKN clocks used for shifting the user data/alignment monitor patterns out of FIFO memories 210 and into detectors 220. R×CLK for clocking of the combiner 230 and the user interface is also generated from the channel clocks CLKs outputted by clock recovery and data decoders 250.

The alignment pattern frame signals received by reassembly control logic 240 from detectors 220 are used to determine the relative transmission time delays 30 (FIG. 3) for T1 data channels CHANNELs 1-N. First, the data channel(s) having the longest transmission time delay 30 (FIG. 3) is/are determined. Once the T1 data channel(s) having the longest transmission delay is/are identified, reassembly control logic 240 adjusts the depth of each FIFO memory 210 associated with each data channel so that each individual data channel experiences the same amount of transmission delay. As previously described, the depth of each FIFO memory 210 is adjusted by "gapping" CLK1−CLKN, i.e. suppressing clock pulses, for outputting the individual datastreams from FIFOs 210 to detectors 220.

The alignment monitoring pattern frame signals inputted into reassembly control logic 240 from detectors 220 are used by control logic 240 for monitoring the alignment of CHANNELs 1-N of the carrier network, and to detect any loss of alignment. Based on the alignment monitor pattern frame signal, reassembly control logic 240 outputs an alignment status signal, LclALIGN, to its local DISASSEMBLY 10. In the event that CHANNELs 1-N are aligned, the alignment status signal LclALIGN equals TRUE. However, if alignment of one or more of the individual T1 data channels CHANNELs 1-N is lost, the alignment status signal LclALIGN is set to FALSE and transmitted to DISASSEMBLY 10.

Finally, reassembly control logic 240 also generates a R×READY signal which is transmitted to the user interface once it is determined that the carrier network channels are aligned. R×READY will continue to be TRUE while CHANNELs 1-N are aligned, the alignment monitoring patterns indicate that all of the individual data channels CHANNELs 1-N are maintaining alignment, and valid data is present on the user interface R×DATA line.

Figure 8:
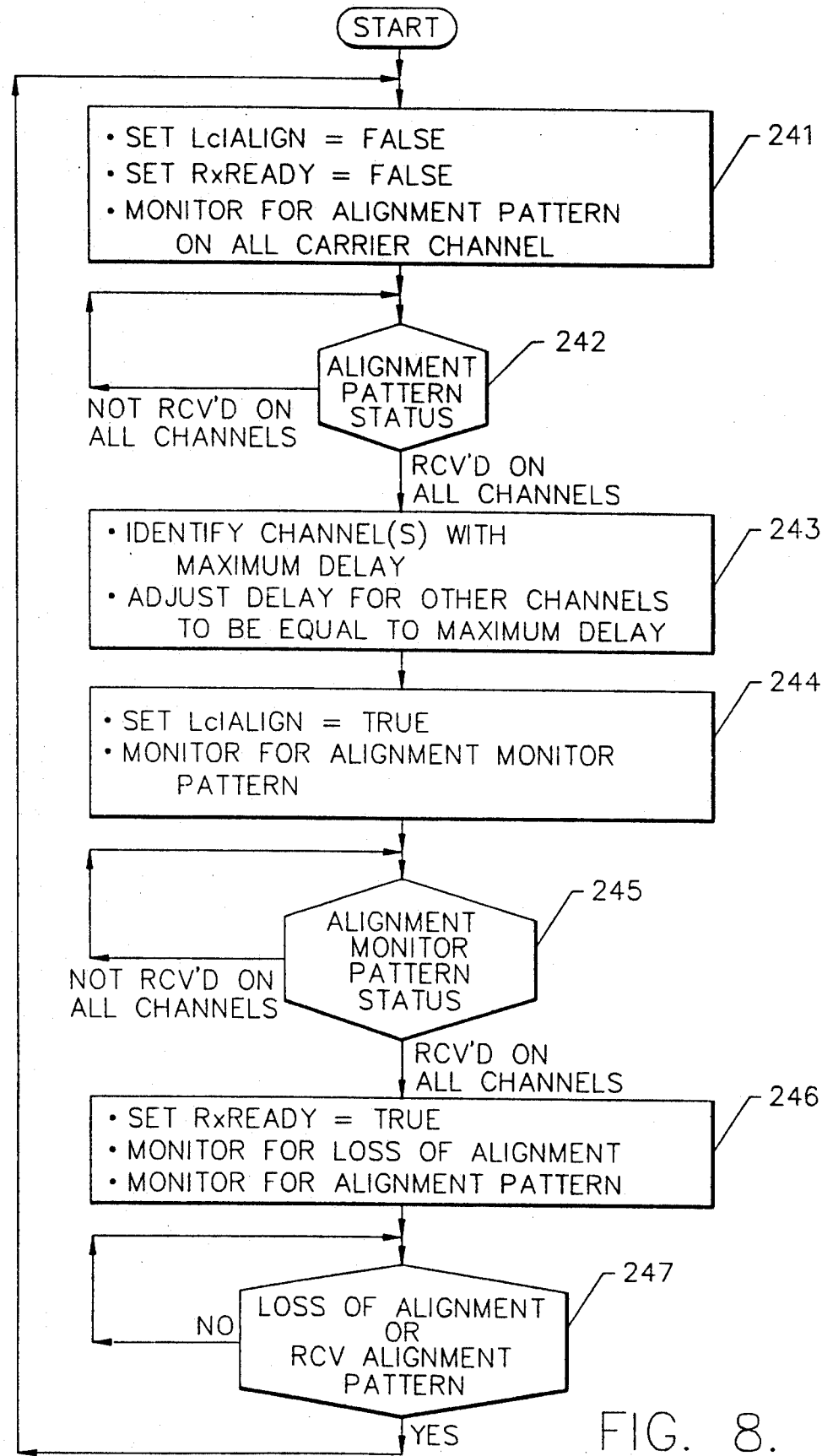
FIG. 8 illustrates the operations performed by the reassembly control logic for implementing a single high bandwidth channel of FIG. 7.

Referring to FIG. 8, the operation performed by flow of the reassembly process will now be described. These operations may be implemented using a general purpose microprocessor running a stored program, by custom logic, or by other well known means. At Block 240 the alignment status signal LclALIGN is set to FALSE and the receiver user interface signal R×READY is set to FALSE. Once LclALIGN and R×READY are set to FALSE, all T1 data channels CHANNELs 1-N of the carrier network are monitored for receipt of the alignment pattern.

A determination is made at Block 242 as to the status of the alignment pattern. If it is determined at Block 242 that the alignment pattern has not been received on all of the data channels CHANNELs 1-N, monitoring of CHANNELs 1-N continues. However, if it is determined at Block 242 that the alignment pattern has been received on all of the individual data channels, the channel(s) having the longest or maximum transmission time delay is/are identified at Block 243. The system then adjusts the FIFO memories 210 by gapping/holding the clocks CLK1-CLKN so that the transmission delays of all channels are equal to the longest transmission delay.

Next, reassembly control logic 240 sets the alignment status signal LclALIGN equal to TRUE at Block 244. The control logic then monitors the alignment monitor pattern detected by detectors 220. A determination is made at Block 245 regarding the status of the alignment monitor pattern. If it is determined at Block 245 that the alignment monitor pattern is not received on all data channels, monitoring of the alignment pattern status continues. However, if it is determined at 245 that the alignment monitor pattern has been received on all T1 data channels CHANNELs 1-N, the channels are aligned and the system proceeds accordingly at Block 246. The user interface signal R×READY is set equal to TRUE and transmitted to the user interface to indicate that all the data channels are aligned, the proper alignment monitor pattern is being received, and that valid user data R×DATA is present on the user interface R×DATA line.

Continuing at Block 246, the system monitors the channels for loss of alignment by monitoring the alignment monitor patterns detected by detectors 220. A determination is made at Block 247 whether alignment is lost or a new alignment pattern has been received. If it is determined at Block 247 that alignment is not lost, i.e. the alignment monitor patterns received on CHANNELs 1-N are proper, the system continues to transmit a R×READY signal equal to TRUE to the user interface and a LclALIGN signal equal to TRUE to DISASSEMBLY 10. However, if it is determined at Block 247 that alignment of the channels is lost, as a result of improper alignment monitor patterns being received, or that a new alignment pattern is received, control is transferred to Block 241 for reinitializing of REASSEMBLY 20. The LclALIGN signal is set equal to FALSE and transmitted to DISASSEMBLY 10 to indicate that CHANNELs 1-N of the carrier network are not aligned. R×READY is set equal to FALSE and sent to the user interface to indicate that the data channels are not aligned and user data is not presently on the R×DATA line.

END-TO-END EXAMPLE OF A "FRACTIONAL T3" SYSTEM

A specific end-to-end example of the operation of the "fractional T3" system according to the present invention will now be described. For purposes of this example of a "fractional T3" network, which may be referred to as an "N × T1" system, assume that there are eight individual T1 data channels, i.e. N=8. Each of the individual T1 data channels, CHANNELs 1-8, has a total channel rate of 1.544 megabits per second, 1.536 megabits per second being dedicated to user data and 8 kilobits per second being reserved for framing and overhead functions, e.g. alignment and alignment monitor patterns. Therefore, the payload data rate for N=8 is 8×(1.544 megabits per second-8 kilobits per second)=12.288 megabits per second. This example uses the T1 channel framing pattern as both the alignment pattern and the alignment monitoring pattern.

Referring to FIG. 5, DISASSEMBLY 10 operates as follows. Clock generator 110 is referenced to an N × channel data rate=8×1.544=12.352 megahertz timing base. As previously described, clock generator 110 clocks the alignment pattern and the user data/alignment monitor pattern onto CHANNELs 1-8. The generation of the alignment pattern by generator 120 and generation of the alignment monitor pattern by generator 130 have both been previously prescribed. User data T×DATA is clocked from the user interface into the channel multiplexors, i.e. CHANNEL 1-8 MUXes 150, by T×CLK at a rate equal to 12.288 megabits per second. The T1 frame bit pattern from the alignment and alignment monitor pattern generators 120 and 130 are also clocked into CHANNEL 1-8 MUXes 150 at 12.288 megabits per second. Since there are eight individual T1 data channels, there are also eight channel multiplexors, i.e. CHANNEL 1-8 MUXes 150, eight line signal encoders 160 and eight line drivers 170. As previously described, one framing bit, i.e. overhead bit, is transmitted on each T1 data channel for every 192 user data bits. Each framing bit of the framing pattern is added to the 192 payload user data bits at the exact same time for each of the eight T1 data channels in order to continuously provide the alignment pattern to the individual T1 channels on the carrier network. The same is true for providing the alignment monitor pattern which is also the framing pattern.

The output of each channel multiplexor CHANNEL 1-8 MUXes 150 is input into the corresponding line signal encoder 160 for performing the T1 line coding, so that the alignment pattern or user data T×DATA/alignment monitor pattern may be sent to the carrier network. Operation of line drivers 170 which control transmission of signals on the T1 channels will be understood by those having skill in the art.

All T1 data channels, CHANNELs 1-8, operate at the exact same frequency. This frequency is preserved by the carrier network. However, the individual T1 data channels will experience different transmission time delays. Different transmission time delays are experienced by each T1 data channel because the T1 channels may be routed on different physical paths, and the transmission equipment introduces different delays. As a result, the framing bits which combine to form the alignment pattern and alignment monitor pattern are received at different times at the receiver end of the system, even though the framing bits were inserted into each individual datastream at the same time by the channel multiplexors CHANNEL 1-8 MUXes 150 under the control of disassembly control logic 140.

Referring to FIG. 7, processing of REASSEMBLY 20 for this example will now be described. Since there are eight T1 data channels CHANNELs 1-8 for this example, there are eight receivers 260, eight clock recovery and data decoders 250, eight FIFO memories 210, and eight alignment and alignment monitor pattern detectors 220, one for each of the individual T1 channels.

Since the T1 framing pattern is used as both the alignment pattern and the alignment monitor pattern, detectors 220 are T1 framing circuits. An example of a suitable T1 framing circuit is Model No. 9170 T1 Framing Circuit marketed by Rockwell International Corporation. Each framing circuit, i.e. detector 220, searches the individual datastreams R×DATA received on the corresponding data channel of CHANNELs 1-8 for the T1 frame bit (sync) pattern. The operation of a framing circuit need not be described further. Each detector 220 outputs a frame sync pulse to reassembly control logic 240 each time a T1 frame sync pulse is detected. Reassembly control logic 240 uses the frame sync pulses to perform the alignment and alignment monitoring process as described above with respect to alignment and reassembly.

Initially, when REASSEMBLY 20 receives the alignment pattern in the form of the T1 framing pattern, the individual T1 data channels are not aligned. As a result, reassembly control logic 240 sets the R×READY signal to FALSE. The individual datastreams R×DATA received on CHANNELs 1-8 are fed into clock recovery and data decoders 250 by receivers 260. Decoders 250 recover, i.e. extract, the clocks CLKs from the channels to ensure that REAS- SEMBLY 20 is synchronized to the far end transmitter. Decoders 250 then decode R×DATA and clock the decoded R×DATA into FIFOs 210, and output the recovered clocks CLKs to reassembly control logic 240. R×DATA is clocked from the respective decoder 250 into the respective FIFO 210 at a rate of 1.544 megahertz. The individual datastreams R×DATA are then clocked out of the corresponding FIFO memory 210 by CLKs 1-8 generated by reassembly control logic 240 at the same 1.544 megahertz rate and into the respective T1 framing circuit, i.e. alignment and monitor pattern detector 220.

Once the entire framing pattern has been detected by each T1 framing circuit 220, and the frame sync pulses have been outputted by the framing circuits to reassembly control logic 240, the control logic determines which individual T1 channel of CHANNELs 1-8 experiences the maximum or longest transmission delay. Using the T1 framing pattern for alignment allows the maximum delay differential between any two T1 channels to be no greater than 96 bits. The following process is used to identify the T1 channel with the maximum delay by identifying the interval between the T1 sync pulse from the T1 channel having the greatest delay and the T1 sync pulse from the T1 channel having the smallest delay.

Reassembly control logic 240 has a counter capable of counting to one half (96 bits) of the period of the alignment pattern (the 193 bit T1 framing pattern). This counter is clocked by any of the recovered or extracted T1 clocks CLKs from clock recovery and data decoders 250. Any of the recovered clocks may be used since CHANNELs 1-8 all operate at the same frequency. The counter of control logic 240 stops counting when it reaches a maximum count of one half of the period of the alignment pattern, i.e. 96 bits.

Every time one of the frame sync pulses is sent by detectors 220 to reassembly control logic 240, the counter is reset to zero. At some point, the counter will reach the maximum count of 96 bits, and stop counting. The counter will reach the maximum count because all of the alignment pattern/frame sync pulses will occur within one half of the period of the T1 frame (96 bits). Once the counter reaches this maximum, the next frame sync pulse received from detectors 220 corresponds to the T1 channel experiencing the minimum or shortest transmission delay. Once the T1 channel experiencing the shortest transmission delay is identified, the order of the other T1 channels based on their relative transmission delay can easily be derived by counting the number of bits of relative delay. The alignment pattern/frame sync pulse which occurs the longest time after the sync pulse of the T1 channel experiencing the shortest transmission delay is the T1 channel which experiences the maximum transmission delay.

For example, assuming that CHANNEL 5 experiences the longest transmission delay, reassembly control logic 240 adjusts the effective depth of the FIFO memories 210 for all other T1 channels, i.e. CHANNELs 1-4 and 6-8, so that their transmission delay is equal to that of CHANNEL 5. If, for example, CHANNEL 2 experiences 17 bits less delay in receiving the alignment pattern than that of CHANNEL 5, reassembly control logic 240 holds off, i.e. "gaps", CLK 2 for 17 bit times. This gapping of CLK 2 effectively increases the depth of FIFO memory 210 for CHANNEL 2 by 17 bits to be equal to the depth of FIFO memory 210 for CHANNEL 5. Each of the other clocks used to clock FIFO memories 210 for the other channels (CHANNELs 1, 3, 4, 6, 7 and 8) is similarly gapped dependent upon the amount of its respective delay which is less than that of CHANNEL 5. Thus, the total delay for each of the individual T1 data channels (CHANNELs 1-8) is now equal, in that the transmission delay of each of the channels is equal to that of CHANNEL 5.

Reassembly control logic 240 does not need to know that there are 17 bits of difference between the transmission delays of CHANNEL 2 and CHANNEL 5. Rather, reassembly control logic 240 can simply gate CLK 2 once per T1 frame until the frame sync pulse from CHANNEL 2 agrees with the frame sync pulse for CHANNEL 5. It will be understood by those having skill in the art that alignment of the T1 channels to CHANNEL 5 may be performed in parallel.

Once the frame sync pulses detected by detectors 220 for all individual T1 channels CHANNELs 1-8 are lined up, reassembly control logic 240 sets the alignment status signal LclALIGN to "TRUE" and transmits this signal to DISASSEMBLY 10 to indicate that the channels are aligned. Once all of the frame sync pulses from detector 220 line up and thus, the receiver is aligned, CLKs 1-8 which clock data out of FIFO memories 210, need not be gapped. As a result, the average effective depths of FIFO memories 210 maintain a fixed relationship with respect to one another. Reassembly control logic 240 then sets R×READY to TRUE to indicate that user data R×DATA is available for use by the user interface.

The user data is interleaved with the alignment monitor pattern. In this example, the framing pattern is also used as the alignment monitor pattern. Thus, alignment and alignment monitor pattern detectors 220, i.e. framing circuits, search for the framing pattern interleaved with the user data of the individual datastreams received on CHANNELs 1-8 and transfer frame sync pulses to reassembly control logic 240. The control logic monitors the frame sync pulses from each detector 220 to make sure that all frame sync pulses are lined up, i.e. the channels remain aligned. In the event that reassembly control logic 240 determines that the frame sync pulses are not lined up, alignment is lost and the channels must once again be aligned via the alignment process described above. The channels will remain aligned in normal steady state network conditions. Typically, alignment will only be lost when one or more of the T1 channels are disrupted in some manner.

The user data R×DATA minus the alignment monitor pattern (the framing pattern) is transferred from detectors 220 to combiner 230. Combiner 230, as previously described, is clocked by R×CLK which is generated by the reassembly control logic 240. It combines the individual datastreams in the exact same order in which they were transmitted. The combined datastream is then transferred to the user interface on the R×DATA line.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. Apparatus for transforming a plurality of relatively low bandwidth telecommunications channels into a relatively high bandwidth telecommunications channel, comprising:

means for determining relative transmission time delays among said low bandwidth channels; and means, responsive to said determining means, for equalizing transmission time delay across said plurality of low bandwidth channels to produce a plurality of time delay equalized low bandwidth channels;

wherein said determining means comprises means for identifying one of the low bandwidth channels among said plurality of low bandwidth channels having longest transmission time delay, and for calculating a time delay difference between the identified one of the low bandwidth channels having longest transmission time delay and each of said plurality of low bandwidth channels other than the identified one of the low bandwidth channels having the longest transmission time delay; and wherein said equalizing means comprises means for adding time delay to each low bandwidth channel other than the identified one of the low bandwidth channels having longest transmission time delay, corresponding to the calculated time delay difference for the associated low bandwidth channel;

whereby the time delay equalized low bandwidth channels form a single high bandwidth channel.

2. The apparatus of claim 1 wherein said determining means further comprises:

means for transmitting an alignment signal across each of said low bandwidth channels;

means for receiving said alignment signal from each of said low bandwidth channels; and means, responsive to said receiving means, for measuring time differences among the received alignment signals at each of said low bandwidth channels.

3. The apparatus of claim 2, wherein each of said low bandwidth communications channels comprises a T1 data communications channel, and wherein said alignment signal comprises a T1 channel frame synchronization pattern.

4. The apparatus of claim 1 further comprising:

means for transmitting high bandwidth data across said plurality of low bandwidth channels; and means for asynchronously receiving the transmitted high bandwidth data from said plurality of low bandwidth channels, due to said relative transmission time delays among said low bandwidth channels;

said equalizing means comprising means for aligning and combining the received low bandwidth data channels into a received high bandwidth data channel.

5. The apparatus of claim 4 wherein said transmitting means comprises:

means for disassembling said high bandwidth data into a plurality of low bandwidth datastreams; and means for transmitting a respective one of said plurality of low bandwidth datastreams across a respective one of said low bandwidth channels.

6. The apparatus of claim 4 wherein said equalizing means further comprises means for assembling the time delay equalized low bandwidth data into a single high bandwidth datastream.

7. The apparatus of claim 1 wherein said means for adding time delay comprises a plurality of variable length shift registers, a respective one of which is associated with a respective one of said low bandwidth channels, and means for adjusting the length of each shift register except for the shift register associated with the identified one of the low bandwidth channels having longest transmission time delay to produce a delay corresponding to the calculated time delay for the associated low bandwidth channel.

8. The apparatus of claim 1 wherein each of said low bandwidth communications channels comprises a T1 data communications channel.

9. The apparatus of claim 1 further comprising:

means for verifying that time delays among said low bandwidth channels remain equalized.

10. The apparatus of claim 9 further comprising;

means for concurrently transmitting a plurality of data frames across each of said time delay equalized low bandwidth channels; and wherein said verifying means comprises:

means for concurrently inserting a monitor signal into selected ones of said plurality of data frames transmitted across each of said time delay equalized low bandwidth channels;

means for receiving said plurality of data frames including the monitor signal concurrently inserted into selected ones of said plurality of data frames transmitted across each of said time delay equalized low bandwidth channels;

means for extracting the monitor signal from the received selected ones of said plurality of data frames having the monitor signal concurrently inserted therein; and means, responsive to said extracting means, for verifying that time delay differences do not exist among said received plurality of data frames concurrently transmitted across each of said time delay equalized low bandwidth channels.

11. The apparatus of claim 10 wherein each of said low bandwidth communications channels comprises a T1 data communications channel, and wherein said monitor signal comprises a T1 channel frame synchronization pattern.

12. The apparatus of claim 10 wherein each of said low bandwidth communications channels comprises a T1 data communication channel, and wherein said monitor signal comprises a pseudorandom data sequence.

13. The apparatus of claim 10 wherein said transmitting means comprises means for repeatedly transmitting the monitor signal across each of said time delay equalized low bandwidth channels.

14. Apparatus for assembling a relatively high bandwidth communications datastream from a plurality of relatively low bandwidth datastreams which are received from a respective plurality of relatively low bandwidth telecommunications channels, comprising:

means for equalizing transmission time delay among said plurality of low bandwidth datastreams by equalizing time delay among the associated plurality of low bandwidth telecommunication channels; and means, responsive to said transmission time delay equalizing means, for combining the plurality of time delay equalized datastreams into a single high bandwidth communications datastream;

wherein said equalizing means comprises:

means for identifying one of the low bandwidth channels among said plurality of low bandwidth channels having longest transmission time delay;

means, responsive to said identifying means, for calculating a time delay difference between the identified one of the low bandwidth channels having longest transmission time delay and each of said plurality of low bandwidth channels other than the identified one of the low bandwidth channels having the longest transmission time delay; and means, responsive to said calculating means, for adding time delay to each low bandwidth channel other than the identified one of the low bandwidth channels having longest transmission time delay, corresponding to the calculated time delay difference for the associated low bandwidth channel.

15. The apparatus of claim 14 wherein said equalizing means further comprises:

means for receiving an alignment signal from each of said low bandwidth channels; and means, responsive to said receiving means, for measuring time differences among the received alignment signals at each of said low bandwidth channels;

wherein said identifying means is responsive to said measuring means.

16. The apparatus of claim 14 wherein said means for adding time delay comprises a plurality of variable length shift registers, a respective one of which is associated with a respective one of said low bandwidth channels, and means for adjusting the length of each shift register except for the shift register associated with the identified one of the low bandwidth channels having longest transmission time delay to produce a delay corresponding to the calculated time delay for the associated low bandwidth channel.

17. The apparatus of claim 14 wherein each of said low bandwidth communications channels comprises a T1 data communications channel.

18. The apparatus of claim 14 further comprising: means for verifying that time delays among said low bandwidth channels remain equalized.

19. The apparatus of claim 18 wherein said verifying means comprises:

means for receiving a plurality of data frames concurrently transmitted across each of said time delay equalized low bandwidth channels, selected ones of said plurality of data frames having a monitor signal concurrently inserted therein;

means for extracting the monitor signal from the received selected ones of said plurality of data frames having a monitor signal concurrently inserted therein; and means, responsive to said extracting means, for verifying that time delay differences do not exist among said received plurality of data frames concurrently transmitted across each of said time delay equalized low bandwidth channels.

20. The apparatus of claim 19 wherein each of said low bandwidth communications channels comprises a T1 data communications channel, and wherein said monitor signal comprises a T1 channel frame synchronization pattern.

21. The apparatus of claim 19 wherein each of said low bandwidth communications channels comprises a T1 data communication channel, and wherein said monitor signal comprises a pseudorandom data sequence.

22. Apparatus for disassembling a relative high bandwidth communications datastream into a plurality of relatively low bandwidth communications datastreams each having a plurality of data frames, for transmission on a corresponding plurality of relatively low bandwidth telecommunications channels, comprising:

means for splitting said high bandwidth communications datastream into a plurality of low bandwidth datastreams each having a plurality of data frames;

means for concurrently inserting an alignment signal into a corresponding data frame of each of said plurality of low bandwidth datastreams;

means for concurrently transmitting a respective one of said plurality of low bandwidth datastreams, including the concurrently inserted alignment signals, on a respective one of said plurality of low bandwidth channels; and means for concurrently inserting a monitor signal into selected ones of said data frames of each of said plurality of low bandwidth datastreams transmitted across each of said low bandwidth channels; and wherein said concurrent transmitting means further comprises means for concurrently transmitting a respective one of said plurality of low bandwidth datastreams, including the concurrently inserted alignment signals and the concurrently inserted monitor signals inserted into selected ones of said data frames, on a respective one of said plurality of low bandwidth channels.

23. The apparatus of claim 22 wherein each of said low bandwidth communications channels comprises a T1 data communications channel.

24. The apparatus of claim 22 wherein each of said low bandwidth communications channels comprises a T1 data communications channel, and wherein said alignment signal comprises a T1 channel frame synchronization pattern.

25. The apparatus of claim 22 wherein each of said low bandwidth communications channels comprises a T1 data communications channel, and wherein said monitor signal comprises a T1 channel frame synchronization pattern.

26. The apparatus of claim 22 wherein each of said low bandwidth communications channels comprises a T1 data communication channel, and wherein said monitor signal comprises a pseudorandom data sequence.

27. The apparatus of claim 22 wherein said concurrent inserting means comprises means for repeatedly and concurrently inserting the monitor signal into each of said plurality of low bandwidth datastreams.

28. A method for transforming a plurality of relatively low bandwidth telecommunications channels into a relatively high bandwidth telecommunications channel, comprising the steps of:

determining relative transmission time delays among said low bandwidth channels; and equalizing transmission time delay across said plurality of low bandwidth channels, based upon the relative time delays among said low bandwidth channels, to produce a plurality of time delay equalized low bandwidth channels;

wherein said determining step comprises the steps of identifying one of the low bandwidth channels among said plurality of low bandwidth channels having longest transmission time delay, and calculating a time delay difference between the identified one of the low bandwidth channels having longest transmission time delay and each of said plurality of low bandwidth channels other than the identified one of the low bandwidth channels having longest transmission time delay; and wherein said equalizing step comprises the step of adding time delay to each low bandwidth channel other than the identified one of the low bandwidth channels having longest transmission time delay, corresponding to the calculated time delay difference for the associated low bandwidth channel; whereby the time delay equalized low bandwidth channels form a single high bandwidth channel.

29. The method of claim 28 wherein said determining step further comprises the steps of:

transmitting an alignment signal across each of said low bandwidth channels;

receiving said alignment signal from each of said low bandwidth channels; and measuring time differences among the received alignment signals at each of said low bandwidth channels, to thereby determine relative transmission time delays among said low bandwidth channels.

30. The method of claim 29 wherein each of said low bandwidth communications channels comprises a T1 data communications channel, and wherein said alignment signal transmission step comprises the step of transmitting a T1 channel frame synchronization pattern across each of said low bandwidth channels.

31. The method of claim 28 wherein said equalizing step is followed by the steps of:

transmitting high bandwidth data across said plurality of time delay equalized low bandwidth channels; and receiving the high bandwidth data from said plurality of time delay equalized low bandwidth channels, notwithstanding said relative transmission time delays among said low bandwidth channels.

32. The method of claim 31 wherein said transmitting step comprises the steps of:

disassembling said high bandwidth data into a plurality of low bandwidth datastreams; and synchronously transmitting a respective one of said plurality of low bandwidth datastreams across a respective one of said time delay equalized low bandwidth channels.

33. The method of claim 31 further comprising the step of:

assembling the time delay equalized low bandwidth data into a single high bandwidth datastream.

34. The method of claim 28 further comprising the step of:

verifying that time delays among said low bandwidth channels remain equalized.

35. The method of claim 34 wherein said verifying step comprises the steps of:

concurrently transmitting a plurality of data frames across each of said time delay equalized low bandwidth channels;

concurrently inserting a monitor signal into selected ones of said plurality of data frames transmitted across each of said time delay equalized low bandwidth channels;

receiving said plurality of data frames including the monitor signal concurrently inserted into selected ones of said plurality of data frames transmitted across each of said time delay equalized low bandwidth channels;

extracting the monitor signal from the received selected ones of said plurality of data frames having the monitor signal concurrently inserted therein; and verifying that time delay differences do not exist among said received plurality of data frames concurrently transmitted across each of said time delay equalized low bandwidth channels.

36. The method of claim 35 wherein each of said low bandwidth communications channels comprises a T1 data communications channel, and wherein said monitor signal transmitting step comprises the step of transmitting a T1 channel frame synchronization pattern across each of said low bandwidth channels.

37. The method of claim 35 wherein each of said low bandwidth communications channels comprises a T1 data communication channel, and wherein said monitor signal transmitting step comprises the step of transmitting a pseudorandom data sequence across each of said low bandwidth channels.

38. The method of claim 35 wherein said transmitting step comprises the step of repeatedly transmitting the monitor signal, wherein said receiving step comprises the step of repeatedly receiving said monitor signal, and wherein said verifying step comprises the step of repeatedly verifying that time differences do not exist among the received monitor signals.

39. A method for assembling a relatively high bandwidth communications datastream from a plurality of relatively low bandwidth datastreams which are received from a respective plurality of relatively low bandwidth telecommunications channels, comprising the steps of:

equalizing transmission time delay among said plurality of low bandwidth datastreams by equalizing time delay among the associated plurality of low bandwidth telecommunication channels; and combining the plurality of time delay equalized datastreams into a single high bandwidth communications datastream;

wherein said equalizing step comprises:

identifying one of the low bandwidth channels among the plurality of low bandwidth channels having longest transmission time delay;

calculating a time delay difference between the identified one of the low bandwidth channels having longest transmission time delay and each of said plurality of low bandwidth channels other than the identified one of the low bandwidth channels having longest transmission time delay; and adding time delay to each low bandwidth channel other than the identified one of the low bandwidth channels having longest transmission time delay, corresponding to the calculated time delay difference for the associated low bandwidth channel.

40. The method of claim 39 wherein said equalizing step means further comprises the steps of:

receiving an alignment signal from each of said low bandwidth channels; and measuring time differences among the received alignment signals at each of said low bandwidth channels;

wherein said identifying step is responsive to said measuring step.

41. The method of claim 39 further comprising the step of:

verifying that time delays among said low bandwidth channels remain equalized.

42. The method of claim 41 wherein said verifying step comprises the steps of:

receiving a plurality of data frames concurrently transmitted across each of said time delay equalized low bandwidth channels, selected ones of said plurality of data frames having a monitor signal concurrently inserted therein;

extracting the monitor signal from the received selected ones of said plurality of data frames having a monitor signal concurrently inserted therein; and verifying that time delay differences do not exist among said received plurality of data frames concurrently transmitted across each of said time delay equalized low bandwidth channels.

43. The method of claim 42 wherein each of said bandwidth communications channels comprises a T1 data communications channel, and wherein said monitor signal receiving step comprises the step of receiving a T1 channel frame synchronization pattern from each of said low bandwidth channels.

44. The method of claim 42 wherein each of said low bandwidth communications channels comprises a T1 data communication channel, and wherein said monitor signal receiving step comprises the step of receiving a pseudorandom data sequence from each of said low bandwidth channels.

45. A method for disassembling a relatively high bandwidth communications datastream into a plurality of relatively low bandwidth communications datastreams each having a plurality of data frames, for transmission on a corresponding plurality of relatively low bandwidth telecommunications channels, comprising the steps of:

splitting said high bandwidth communications datastream into a plurality of low bandwidth datastreams each having a plurality of data frames;

concurrently inserting an alignment signal into a corresponding data frame of each of said plurality of low bandwidth datastreams;

concurrently transmitting a respective one of said plurality of low bandwidth datastreams, including the concurrently inserted alignment signals, on a respective one of said plurality of low bandwidth channels; and concurrently inserting a monitor signal into selected ones of said data frames of each of said plurality of low bandwidth datastreams transmitted across each of said low bandwidth channels;

wherein said concurrent transmitting step further comprises the step of concurrently transmitting a respective one of said plurality of low bandwidth datastreams, including the concurrently inserted alignment signals and the concurrently inserted monitor signals inserted into selected ones of said data frames, on a respective one of said plurality of low bandwidth channels.

46. The method of claim 45 wherein each of said low bandwidth communications channels comprises a T1 data communications channel, and wherein said alignment signal inserting step comprises the step of concurrently inserting a T1 channel frame synchronization pattern in each of said T1 channels.

47. The method of claim 45 wherein each of said low bandwidth communications channels comprises a T1 data communications channel, and wherein said monitor signal inserting step comprises the step of concurrently inserting a T1 channel frame alignment pattern into each of said plurality of low bandwidth datastreams.

48. The method of claim 45 wherein each of said low bandwidth communications channels comprises a T1 data communication channel, and wherein said monitor signal inserting step comprises the step of concurrently inserting a pseudorandom data sequence into each of said plurality of low bandwidth signals.

49. The method of claim 45 wherein said monitor signal inserting step comprises the step of repeatedly and concurrently inserting the monitor signal into each of said plurality of low bandwidth datastreams.

50. Apparatus for transforming a plurality of relatively low bandwidth telecommunications channels into a relatively high bandwidth telecommunications channel comprising:

means for determining relative transmission time delays among said low bandwidth channels;

means, responsive to said determining means, for equalizing transmission time delay across said plurality of low bandwidth channels to produce a plurality of time delay equalized low bandwidth channels;

means for concurrently transmitting a plurality of data frames across each of said time delay equalized low bandwidth channels;

means for concurrently inserting a monitor signal into selected ones of said plurality of data frames transmitted across each of said time delay equalized low bandwidth channels;

means for receiving said plurality of data frames including the monitor signal concurrently inserted into selected ones of said plurality of data frames transmitted across each of said time delay equalized low bandwidth channels;

means, responsive to said receiving means, for extracting the monitor signal from the received selected ones of said plurality of data frames having the monitor signal concurrently inserted therein; and means, responsive to said extracting means, for verifying that time delay differences do not exist among said received plurality of data frames transmitted across said low bandwidth channels.

51. The apparatus of claim 50 wherein each of said low bandwidth communications channels comprises a T1 data communications channel, and wherein said monitor signal comprises a T1 channel frame synchronization pattern.

52. The apparatus of claim 50 wherein each of said low bandwidth communications channels comprises a T1 data communication channel, and wherein said monitor signal comprises a pseudorandom data sequence.

53. The apparatus of claim 50 wherein said transmitting means comprises means for repeatedly transmitting the monitor signal across each of said time delay equalized low bandwidth channels.

54. A method for transforming a plurality of relatively low bandwidth telecommunications channels into a relatively high bandwidth telecommunications channel comprising the steps of:

determining relative transmission time delays among said low bandwidth channels;

equalizing transmission time delay across said plurality of low bandwidth channels to produce a plurality of time delay equalized low bandwidth channels;

concurrently transmitting a plurality of data frames across each of said time delay equalized low bandwidth channels;

concurrently inserting a monitor signal into selected ones of said plurality of data frames transmitted across each of said time delay equalized low bandwidth channels;

receiving said plurality of data frames including the monitor signal concurrently inserted into selected ones of said plurality of data frames transmitted across each of said time delay equalized low bandwidth channels;

extracting the monitor signal from the received selected ones of said plurality of data frames having the monitor signal concurrently inserted therein; and verifying that time delay differences do not exist among said received plurality of data frames transmitted across said low bandwidth channels.

55. The method of claim 54 wherein each of said low bandwidth communications channels comprises a T1 data communications channel, and wherein said monitor signal comprises a T1 channel frame synchronization pattern.

56. The method of claim 54 wherein each of said low bandwidth communications channels comprises a T1 data communication channel, and wherein said monitor signal comprises a pseudorandom data sequence.

57. The method of claim 54 wherein said transmitting step comprises the steps of repeatedly transmitting the monitor signal across each of said time delay equalized low bandwidth channels.

* * * * *